United States Patent
Kakeno et al.

(10) Patent No.: US 10,153,504 B2
(45) Date of Patent: Dec. 11, 2018

(54) FUEL CELL SYSTEM

(71) Applicant: TOYOTA JIDOSHA KABUSHIKI KAISHA, Toyota-shi, Aichi-ken (JP)

(72) Inventors: Yuji Kakeno, Nisshin (JP); Yutaka Tano, Toyota (JP); Shinji Aso, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 49 days.

(21) Appl. No.: 15/638,532

(22) Filed: Jun. 30, 2017

(65) Prior Publication Data

US 2018/0019489 A1  Jan. 18, 2018

(30) Foreign Application Priority Data

Jul. 14, 2016 (JP) ................................. 2016-139097

(51) Int. Cl.
*H01M 8/04089* (2016.01)
*H01M 8/04858* (2016.01)
(Continued)

(52) U.S. Cl.
CPC ... *H01M 8/04865* (2013.01); *H01M 8/04089* (2013.01); *H01M 8/04544* (2013.01);
(Continued)

(58) Field of Classification Search
CPC ......... H01M 8/04865; H01M 8/04559; H01M 8/04089; H01M 8/04544
See application file for complete search history.

(56) References Cited

U.S. PATENT DOCUMENTS 8,273,490 B2 * 9/2012 Umayahara ........... B60L 3/0046
429/428
2008/0116873 A1 5/2008 Takada et al.
(Continued)

FOREIGN PATENT DOCUMENTS

JP 2006134601 A 5/2006
JP 2009268331 A 11/2009
(Continued)

*Primary Examiner* — Stewart A Fraser
(74) *Attorney, Agent, or Firm* — Dickinson Wright, PLLC

(57) ABSTRACT

There is provided a fuel cell system. This fuel cell system comprises a fuel cell configured to generate electric power using reactive gases; a voltage sensor configured to measure a voltage output from the fuel cell; a converter configured to boost an input voltage that is input from the fuel cell; and a controller configured to control the converter. In the case where the voltage output from the fuel cell to the converter is to be boosted after a changeover of an operating state of the fuel cell system from an intermittent operation to an ordinary operation, when a duty ratio D1 calculated by Mathematical Formula I is greater than a duty ratio D2 calculated by Mathematical Formula II, the controller causes the converter to boost the voltage output from the fuel cell at the duty ratio D2.

[Math. 1]

$$D1 = 1 - \frac{Vltrg}{VH} \qquad (I)$$

where VH (V) denotes a value of output voltage that is output from the converter, and Vltrg (V) denotes an estimated value of voltage that is output from the fuel cell,
(Continued)

[Math. 2]

$$D2 = 1 - \frac{(Vl + Vlmrg)}{Vhul} \quad \text{(II)}$$

where Vl (V) denotes a measured value of voltage of the fuel cell by the voltage sensor, Vlmrg (V) denotes a correction amount of the measured value Vl, and Vhul (V) denotes a predetermined upper limit value of the output voltage. This configuration prevents the converter from excessively boosting the actual voltage input from the fuel cell and outputting the excessively boosted voltage.

2 Claims, 3 Drawing Sheets

(51) Int. Cl.
*H01M 8/04537* (2016.01)
*H02J 1/00* (2006.01)
*H02M 1/00* (2006.01)
*H01M 16/00* (2006.01)
*H02M 7/44* (2006.01)

(52) U.S. Cl.
CPC ...... *H01M 8/04559* (2013.01); *H01M 16/006* (2013.01); *H01M 2250/20* (2013.01); *H02J 2001/004* (2013.01); *H02M 7/44* (2013.01); *H02M 2001/007* (2013.01); *H02M 2001/0087* (2013.01)

(56) References Cited

U.S. PATENT DOCUMENTS

| | | | |
|---|---|---|---|
| 2008/0220303 A1* | 9/2008 | Yoshida | H01M 8/04097 429/423 |
| 2016/0141675 A1 | 5/2016 | Kaneko et al. | |
| 2017/0302155 A1 | 10/2017 | Takagaki et al. | |

FOREIGN PATENT DOCUMENTS

| | | |
|---|---|---|
| JP | 2010162996 A | 7/2010 |
| JP | 2015019448 A | 1/2015 |
| JP | 2015-220961 A | 12/2015 |
| JP | 2016096042 A | 5/2016 |
| WO | 2016051567 A1 | 4/2016 |

* cited by examiner

FUEL CELL SYSTEM

CROSS-REFERENCE TO RELATED APPLICATIONS

The present application claims priority from Japanese patent application 2016-139097 filed on Jul. 14, 2016, the entirety of the content of which is hereby incorporated by reference into this application.

BACKGROUND

Field

The present disclosure relates to a fuel cell system.

Related Art

A proposed configuration of a fuel cell system includes a fuel cell configured to generate electric power using reactive gases, a voltage sensor configured to measure a voltage in the fuel cell, and a converter configured to boost a voltage input from the fuel cell (as described in, for example, JP 2015-220961A).

In the fuel cell system described in JP 2015-220961A, when the operating system of the fuel cell system is changed over from an intermittent operation that temporarily stops power generation by the fuel cell to an ordinary operation that performs power generation by the fuel cell, the converter is configured to boost the voltage output from the fuel cell. When the converter boosts the voltage, this fuel cell system calculates a duty ratio used in the converter by using an estimated value of voltage that is output from the fuel cell. Using the estimated value is attributed to the difficulty in accurate real-time measurement of the actual voltage of the fuel cell that starts power generation and the improvement of the responsiveness in transient response. When the estimated value is smaller than the value of actual voltage in the fuel cell, the converter is likely to excessively boost the actual voltage input from the fuel cell and output the excessively boosted voltage. There is accordingly a demand for a technique that prevents the converter from excessively boosting the actual voltage input from the fuel cell and outputting the excessively boosted voltage.

SUMMARY

In order to solve at least part the problems described above, the disclosure may be implemented by aspects described below.

(1) According to one aspect of the disclosure, there is provided a fuel cell system. This fuel cell system comprises a fuel cell configured to generate electric power using reactive gases; a voltage sensor configured to measure a voltage output from the fuel cell; a converter configured to boost an input voltage that is input from the fuel cell; and a controller configured to control the converter. In the case where the voltage output from the fuel cell to the converter is to be boosted after a changeover of an operating state of the fuel cell system from an intermittent operation to an ordinary operation, when a duty ratio D1 calculated by Mathematical Formula I is greater than a duty ratio D2 calculated by Mathematical Formula II, the controller causes the converter to boost the voltage output from the fuel cell at the duty ratio D2, and when the duty ratio D1 is equal to or less than the duty ratio D2, the controller causes the converter to boost the voltage output from the fuel cell at the duty ratio D1.

[Math. 1]

$$D1 = 1 - \frac{Vltrg}{VH} \quad \text{(I)}$$

where VH (V) denotes a value of output voltage that is output from the converter, and Vltrg (V) denotes an estimated value of voltage that is output from the fuel cell.

[Math. 2]

$$D2 = 1 - \frac{(Vl + Vlmrg)}{Vhul} \quad \text{(II)}$$

where Vl (V) denotes a measured value of voltage of the fuel cell by the voltage sensor, Vlmrg (V) denotes a correction amount of the measured value Vl, and Vhul (V) denotes a predetermined upper limit value of the output voltage.

In the fuel cell system of this aspect, the duty ratio D2 denotes a duty ratio used to correct the measured value Vl of voltage and boost the corrected value of voltage to the upper limit value Vhul. The duty ratio D2 is accordingly set as the upper limit of the duty ratio. When the duty ratio D1 is greater than the duty ratio D2, the fuel cell system of this aspect is configured to cause the converter to boost the voltage output from the fuel cell at the duty ratio D2. This configuration prevents the converter from excessively boosting the actual voltage input from the fuel cell and outputting the excessively boosted voltage.

(2) According to another aspect of the disclosure, there is provided a fuel cell system. This fuel cell system comprises a fuel cell configured to generate electric power using reactive gases; a voltage sensor configured to measure a voltage output from the fuel cell; a converter configured to boost an input voltage that is input from the fuel cell; and a controller configured to control the converter. In the case where the voltage output from the fuel cell to the converter is to be boosted after a changeover of an operating state of the fuel cell system from an intermittent operation to an ordinary operation, when a duty ratio D1 calculated by Mathematical Formula I is greater than a duty ratio D3 calculated by Mathematical Formula III, the controller causes the converter to boost the voltage output from the fuel cell at the duty ratio D3, and when the duty ratio D1 is equal to or less than the duty ratio D3, the controller causes the converter to boost the voltage output from the fuel cell at the duty ratio D1.

[Math. 1]

$$D1 = 1 - \frac{Vltrg}{VH} \quad \text{(I)}$$

where VH (V) denotes a value of output voltage that is output from the converter, and Vltrg (V) denotes an estimated value of voltage that is output from the fuel cell.

[Math. 3]

$$D3 = 1 - \frac{Vl}{Vhul} + \alpha \quad \text{(III)}$$

where Vl (V) denotes a measured value of voltage of the fuel cell by the voltage sensor, Vhul (V) denotes a predetermined upper limit value of the output voltage, and a denotes a correction amount of the duty ratio.

In the fuel cell system of this aspect, the duty ratio D3 denotes a corrected value of the duty ratio used to boost the measured value Vl of voltage to the upper limit value Vhul. The duty ratio D3 is accordingly set as the upper limit of the duty ratio. When the duty ratio D1 is greater than the duty ratio D3, the fuel cell system of this aspect is configured to cause the converter to boost the voltage output from the fuel cell at the duty ratio D3. This configuration prevents the converter from excessively boosting the actual voltage input from the fuel cell and outputting the excessively boosted voltage.

DESCRIPTION OF EMBODIMENTS

A. First Embodiment

Figure 1:
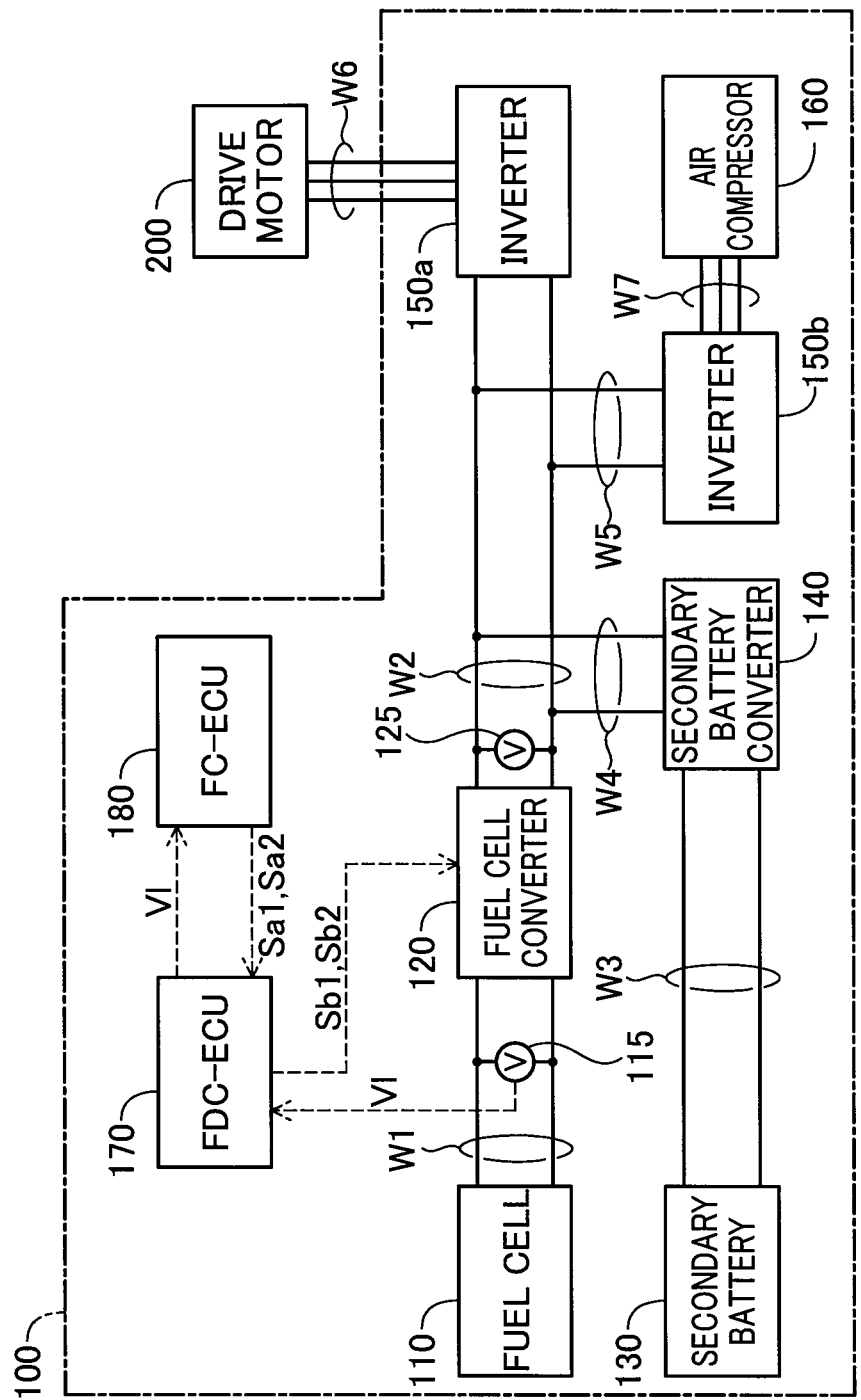
FIG. 1 is a diagram illustrating the electrical configuration of a fuel cell system.

FIG. 1 is a diagram illustrating the electrical configuration of a fuel cell system 100 according to an embodiment of the disclosure. The fuel cell system 100 is mounted as a power supply for a vehicle that is driven with a drive motor 200. The fuel cell system 100 is configured to include a fuel cell 110, a voltage sensor 115, a fuel cell converter 120, a secondary battery 130, a secondary battery converter 140, an inverter 150a, another inverter 150b, an air compressor 160, an FDC-ECU 170 and an FC-ECU 180. The fuel cell system 100 is further configured to include a DC lead wire W1, a DC lead wire W2, a DC lead wire W3, a DC lead wire W4, a DC lead wire W5, an AC lead wire W6 and an AC lead wire W7.

According to this embodiment, the fuel cell 110 is a polymer electrolyte fuel cell configured to receive supplies of hydrogen gas and oxygen and generate electric power by an electrochemical reaction of hydrogen with oxygen. The fuel cell 110 is, however, not necessarily limited to the polymer electrolyte fuel cell, but any of various other types of fuel cells may be employed for the fuel cell 110. For example, a solid oxide fuel cell may be employed for the fuel cell 110, in place of the polymer electrolyte fuel cell. The fuel cell 110 is electrically connected with the fuel cell converter 120 via the DC lead wire W1.

The voltage sensor 115 is connected with the DC lead wire W1 and is configured to measure a voltage output from the fuel cell 110. The voltage sensor 115 is also configured to output a signal indicating a measured value Vl of the voltage output from the fuel cell 110, to the FDC-ECU 170.

The fuel cell converter 120 is provided as a boosting-type converter device and is configured to perform a boosting operation that boosts an input voltage that is input from the fuel cell 110 to a target voltage. The fuel cell converter 120 is electrically connected with the inverter 150a and with the inverter 150b via the DC lead wire W2.

The voltage sensor 125 is connected with the DC lead wire W2 and is configured to measure a voltage output from the fuel cell converter 120. The voltage sensor 125 is also configured to output a signal indicating a measured value of the voltage output from the fuel cell converter 120, to the FDC-ECU 170.

The secondary battery 130 serves, along with the fuel cell 110, as a power supply of the fuel cell system 100. According to this embodiment, the secondary battery 130 is configured by a lithium ion rechargeable battery. According to another embodiment, the secondary battery 130 may be another type of battery, for example, a lead acid battery, a nickel cadmium battery or a nickel metal hydride battery. The secondary battery 130 is electrically connected with the secondary battery converter 140 via the DC lead wire W3.

The secondary battery converter 140 is provided as a boosting-type converter and has a configuration similar to that of the fuel cell converter 120 according to this embodiment. The secondary battery converter 140 is electrically connected via the DC lead wire W4 with the DC lead wire W2 that is arranged to connect the fuel cell converter 120 with the inverter 150a. The secondary battery converter 140 cooperates with the fuel cell converter 120 to regulate the voltage in the DC lead wire W2 that is an input voltage of the inverter 150a and to control charging and discharging of the secondary battery 130.

The secondary battery converter 140 is configured to discharge the secondary battery 130 when an output power from the fuel cell converter 120 is insufficient relative to a target output power. When regenerative electric power is generated by the drive motor 200, on the other hand, the secondary battery converter 140 is configured to accumulate the regenerative electric power into the secondary battery 130. According to a modification, the secondary battery converter 140 may have a configuration different from that of the fuel cell converter 120.

The inverter 150a is configured to convert the electric power supplied in the form of DC power from the fuel cell 110 and the secondary battery 130 via the DC lead wire W2 into a three-phase AC power. The inverter 150a is electrically connected with the drive motor 200 via the AC lead wire W6 to supply the three-phase AC power to the drive motor 200. The inverter 150a is also configured to convert the regenerative electric power generated by the drive motor 200 into a DC power and output the DC power to the DC lead wire W2.

The inverter 150b is electrically connected with the DC lead wire W2 via the DC lead wire W5. The inverter 150b is configured to convert the electric power supplied in the form of DC power from the fuel cell 110 and the secondary battery 130 via the DC lead wire W2 and the DC lead wire W5 into a three-phase AC power. The inverter 150b is electrically connected with the air compressor 160 via the AC lead wire W7 to supply the three-phase AC power to the air compressor 160.

The air compressor 160 is configured to include a synchronous motor that is equipped with three-phase coils. The air compressor 160 is configured to drive the synchronous motor according to the three-phase AC power supplied from the inverter 150b and supply oxygen used for power generation to the fuel cell 110. The air compressor 160 may be operated using either of the electric power supplied from the fuel cell 110 and the electric power supplied from the secondary battery 130. The air compressor 160 is also configured to start supplying oxygen to the fuel cell 110, in response to an instruction from the FC-ECU 180. The FC-ECU 180 is configured to send a signal indicating the instruction to the air compressor 160 via a PM-ECU (not shown) and an MG-ECU (not shown).

The drive motor 200 is provided as a motor configured to convert the three-phase AC power supplied from the inverter 150a into a rotational power.

The FDC-ECU 170 is provided as a high voltage unit controller configured to control the operations of the fuel cell converter 120. The FDC-ECU 170 is configured to receive the signal indicating the measured value Vl from the voltage sensor 115. The FDC-ECU 170 is also configured to output a signal indicating the received measured value Vl to the FC-ECU 180.

The FC-ECU 180 is provided as a controller configured to receive signals output from various sensors provided in the fuel cell system 100 and to control the operations of the respective components of the fuel cell system 100. The FC-ECU 180 is configured by a microcomputer including a CPU, a RAM and a ROM. When the operating state of the fuel cell system 100 is changed over from intermittent operation to ordinary operation, the FC-ECU 180 gives an instruction to the air compressor 160 to start supplying oxygen to the fuel cell 110. The intermittent operation herein denotes an operating state that temporarily stops power generation by the fuel cell 110 during operation of the fuel cell system 100. The ordinary operation herein denotes an operating state that performs power generation by the fuel cell 110 during operation of the fuel cell system 100.

In the case where the voltage output from the fuel cell 110 to the fuel cell converter 120 is to be boosted after the changeover of the operating state of the fuel cell system 100 from the intermittent operation to the ordinary operation, when a duty ratio D1 calculated by Mathematical Formula I given below is greater than a duty ratio D2 calculated by Mathematical Formula II given below, the FC-ECU 180 is configured to cause the fuel cell converter 120 to boost the voltage output from the fuel cell 110 at the duty ratio D2.

[Math. 1]

$$D1 = 1 - \frac{Vltrg}{VH} \quad (I)$$

where VH (V) denotes a value of the output voltage that is output from the fuel cell converter 120, and Vltrg (V) denotes an estimated value of the voltage that is output from the fuel cell 110.

[Math. 2]

$$D2 = 1 - \frac{(Vl + Vlmrg)}{Vhul} \quad (II)$$

where Vl (V) denotes a measured value of the voltage of the fuel cell 110 by the voltage sensor 115, Vlmrg (V) denotes a correction amount of the measured value Vl, and Vhul (V) denotes a predetermined upper limit value of the output voltage.

In the case where the voltage output from the fuel cell 110 to the fuel cell converter 120 is to be boosted after the changeover from the intermittent operation to the ordinary operation, when the duty ratio D1 is equal to or less than the duty ratio D2, on the other hand, the FC-ECU 180 is configured to cause the fuel cell converter 120 to boost the voltage output from the fuel cell 110 at the duty ratio D1.

The duty ratio D1 denotes a duty ratio used to boost the estimated value Vltrg of the voltage that is output from the fuel cell 110 to the value VH of the output voltage that is output from the fuel cell converter 120.

The duty ratio D2 denotes a duty ratio used to correct the measured value Vl of the voltage of the fuel cell 110 by the voltage sensor 115 and boost the voltage to the upper limit value Vhul.

According to this embodiment, when the duty ratio D1 is equal to or less than the duty ratio D2, the FC-ECU 180 outputs a signal Sa1 to the FDC-ECU 170. When receiving the signal Sa1, the FDC-ECU 170 outputs a signal Sb1 to the fuel cell converter 120. This causes the fuel cell converter 120 to start boosting the voltage that is output from the fuel cell 110, at the duty ratio D1.

According to this embodiment, when the duty ratio D1 is greater than the duty ratio D2, on the other hand, the FC-ECU 180 outputs a signal Sa2 to the FDC-ECU 170. When receiving the signal Sa2, the FDC-ECU 170 outputs a signal Sb2 to the fuel cell converter 120. This causes the fuel cell converter 120 to start boosting the voltage that is output from the fuel cell 110, at the duty ratio D2.

According to another embodiment, the FC-ECU 180 may be configured to directly output a signal to the fuel cell converter 120 and thereby cause the fuel cell converter 120 to start boosting the voltage that is output from the fuel cell 110.

The value VH of the output voltage is set in advance to a value of voltage that is required for operation of the drive motor 200. The estimated value Vltrg is set in advance. The upper limit value Vhul is set in advance to a value of voltage that does not cause a failure of the drive motor 200.

The correction amount Vlmrg is a numerical value used to correct the measured value Vl, based on an error of the measured value Vl of the voltage of the fuel cell 110 by the voltage sensor 115 and an error in the fuel cell converter 120.

The error of the measured value Vl of the voltage of the fuel cell 110 by the voltage sensor 115 denotes an error of the measured value Vl from the value of actual voltage of the fuel cell 110. This error includes (1) an error caused by measurement accuracy of the voltage sensor 115 between the measured value Vl of the voltage of the fuel cell 110 by the voltage sensor 115 and the value of actual voltage of the fuel cell 110; (2) an error occurring in the process of converting the voltage of the fuel cell 110 measured by the voltage sensor 115 into a digital signal; and (3) an error from the value of actual voltage of the fuel cell 110 caused by a time difference between the time when the voltage sensor 115 measures the voltage of the fuel cell 110 and outputs a signal indicating the measured value Vl of the voltage to the FDC-ECU 170 and the FC-ECU 180 and the time when the FDC-ECU 170 and the FC-ECU 180 receive the output signal.

The error in the fuel cell converter 120 denotes an error occurring in the process of outputting the signal Sa1 or the signal Sa2 from the FC-ECU 180 to the fuel cell converter 120. This error includes (1) an error caused by a time difference between the time when the FC-ECU 180 outputs the signal Sa1 or the signal Sa2 and the time when the fuel cell converter 120 receives the output signal Sa1 or the output signal Sa2; and (2) an error caused by a variation in production lot of the electric wire which the signal Sa1 or the signal Sa2 output from the FC-ECU 180 to the fuel cell converter 120 passes through.

According to this embodiment, the correction amount Vlmrg is calculated according to an estimation equation that is experimentally determined. According to another embodiment, the correction amount Vlmrg may be computed based on a map that is stored in advance in the FC-ECU 180.

Figure 2:
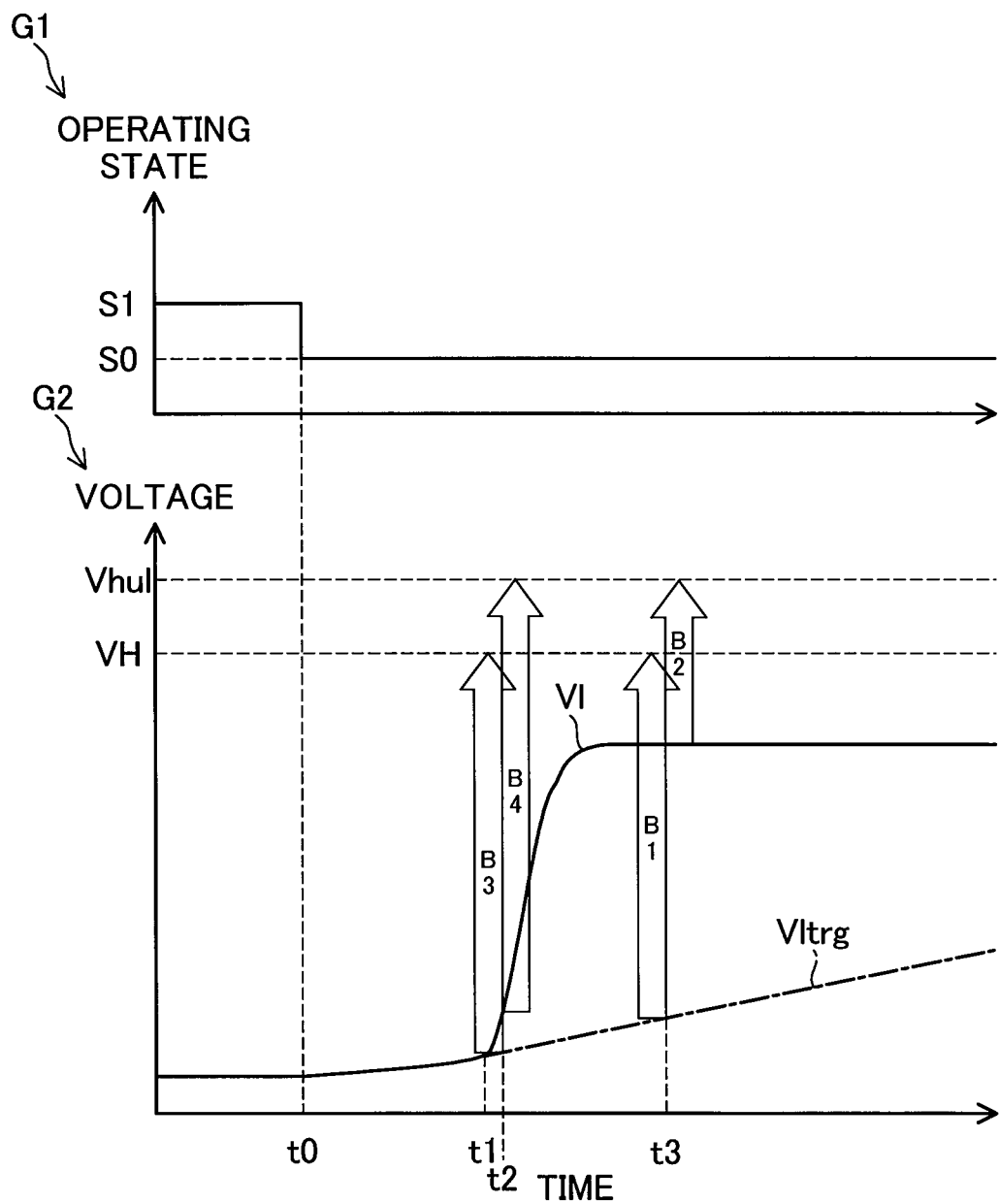
FIG. 2 is a diagram illustrating a variation in measured value when the operating state of the fuel cell system is changed over from an intermittent operation to an ordinary operation.

FIG. 2 is a diagram illustrating a variation in measured value Vl when the operating state of the fuel cell system 100 is changed over from the intermittent operation to the ordinary operation according to this embodiment.

A graph G1 and a graph G2 shown in FIG. 2 show the time as abscissa. In the graph G1, S0 on the ordinate indicates that the operating state of the fuel cell system 100 is the ordinary operation, and S1 indicates that the operating state of the fuel cell system 100 is the intermittent operation.

The graph G2 shows the voltage as ordinate. A solid line curve Vl in the graph G2 shows a variation in the measured value Vl of the voltage of the fuel cell 110 by the voltage sensor 115. More specifically, the graph G2 shows a variation in the measured value Vl after the changeover of the operating state from the intermittent operation to the ordinary operation.

A one-dot chain line curve Vltrg in the graph G2 shows a variation in the estimated value Vltrg of the voltage output from the fuel cell 110. The variation in the estimated value Vltrg overlaps with the variation in the measured value Vl before a timing t1 shown in FIG. 2.

At a timing t0 shown in FIG. 2, the operating state changes over from S1 to S0 in the graph G1. More specifically, the operating state of the fuel cell system 100 is changed over from the intermittent operation to the ordinary operation at the timing t0. At this moment, the air compressor 160 starts supplying oxygen to the fuel cell 110, in response to an instruction from the FC-ECU 180, so that the fuel cell 110 starts power generation.

For a time period from the timing t0 to the timing t1 shown in FIG. 2, the measured value Vl of the voltage of the fuel cell 110 by the voltage sensor 115 is gradually increased by power generation of the fuel cell 110.

The measured value Vl of the voltage of the fuel cell 110 by the voltage sensor 115 increases at a higher increase rate after the timing t1 shown in FIG. 2, compared with the increase rate during the time period from the timing t0 to the timing t1.

After the timing t1, the estimated value Vltrg of the voltage, on the other hand, increases at a lower increase rate, compared with the measured value Vl. This is because a low increase rate is set for the estimated value Vltrg of the voltage, in order to avoid an abrupt change of the duty ratio in the fuel cell converter 120 with a view to stabilizing the voltage output from the fuel cell converter 120.

For example, an arrow B1 indicates a boosting range of the voltage when the estimated value Vltrg of the voltage output from the fuel cell 110 is boosted at the duty ratio D1 at a timing t3 shown in FIG. 2. In this case, the measured value Vl is greater than the estimated value Vltrg, so that an actual voltage that is input from the fuel cell 110 into the fuel cell converter 120 is likely to become greater than the estimated value Vltrg of the voltage. Accordingly, when the actual voltage input into the fuel cell converter 120 is greater than the estimated value Vltrg, the actual voltage input into the fuel cell converter 120 is boosted by the boosting range shown by the arrow B1. The boosted voltage is thus likely to exceed the value VH of the output voltage and is even likely to exceed the upper limit value Vhul in some cases.

The fuel cell system 100 of the first embodiment is, however, configured to set the duty ratio D2 as the upper limit of the duty ratio used to boost the voltage in the fuel cell converter 120. An arrow B2 indicates a boosting range of the voltage when the measured value Vl is boosted at the duty ratio D2 at the timing t3 shown in FIG. 2. The boosting range of the arrow B2 is smaller than the boosting range of the arrow B1. In other words, the duty ratio D1 is greater than the duty ratio D2 at the timing t3 shown in FIG. 2. The fuel cell system 100 is accordingly configured to cause the fuel cell converter 120 to boost the voltage output from the fuel cell 110 at the duty ratio D2. When the estimated value Vltrg of the voltage is boosted at the duty ratio D2 at the timing t3 shown in FIG. 2, the boosted voltage does not exceed the upper limit value Vhul. This configuration accordingly prevents the fuel cell converter 120 from excessively boosting the actual voltage input from the fuel cell 110 and outputting the excessively boosted voltage.

In another example, an arrow B3 indicates a boosting range of the voltage when the estimated value Vltrg of the voltage output from the fuel cell 110 is boosted at the duty ratio D1 at the timing t2 shown in FIG. 2. An arrow B4 indicates a boosting range of the voltage when the measured value Vl is boosted at the duty ratio D2 at the timing t2 shown in FIG. 2. The boosting range of the arrow B4 is larger than the boosting range of the arrow B3. In other words, the duty ratio D1 is equal to or less than the duty ratio D2 at the timing t2 shown in FIG. 2. The fuel cell system 100 is accordingly configured to cause the fuel cell converter 120 to boost the voltage output from the fuel cell 110 at the duty ratio D1. When the estimated value Vltrg of the voltage is boosted at the duty ratio D1 at the timing t2 shown in FIG. 2, the boosted voltage does not exceed the upper limit value Vhul.

In the prior art fuel cell system, a low increase rate is set for the estimated value of the voltage, in order to avoid an abrupt change of the duty ratio in the fuel cell converter with a view to stabilizing the voltage output from the fuel cell converter, as shown by the one-dot chain line curve Vltrg in the graph G2 of FIG. 2. In this prior art fuel cell system, when there is a significant difference between the estimated value of the voltage and the actual voltage input from the fuel cell, the fuel cell converter is likely to excessively boost the actual voltage input from the fuel cell and output the excessively boosted voltage.

In order to reduce such a difference, one possible measure may change the estimated value of the voltage output from the fuel cell. There is, however, a technical difficulty in estimating the output voltage of the fuel cell after the changeover from the intermittent operation to the ordinary operation. Accordingly a low increase rate is set for the estimated value of the voltage output from the fuel cell in the prior art fuel cell system.

The fuel cell system 100 of the first embodiment is, on the other hand, configured to control the fuel cell converter 120, based on the magnitude relationship between the duty ratio D1 and the duty ratio D2 used when the voltage output from the fuel cell 110 is to be boosted. This configuration accordingly prevents the fuel cell converter 120 from excessively boosting the actual voltage input from the fuel cell 110 and outputting the excessively boosted voltage.

Figure 3:
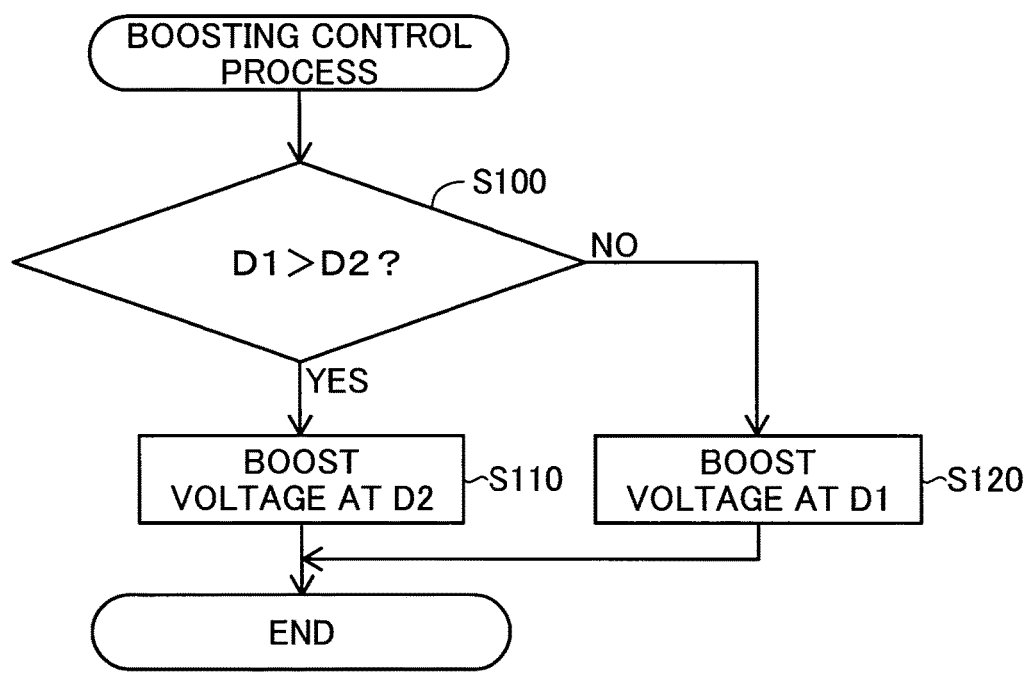
FIG. 3 is a flowchart showing a boosting control process performed by the fuel cell system.

FIG. 3 is a flowchart showing a boosting control process performed by the fuel cell system 100. The boosting control process is performed at regular intervals after the operating state of the fuel cell 100 is changed over from the intermittent operation to the ordinary operation.

When the boosting control process is triggered, the fuel cell system 100 first determines whether the duty ratio D1 is greater than the duty ratio D2 (step S100). When it is determined that the duty ratio D1 is greater than the duty ratio D2 (step S100: YES), the fuel cell system 100 causes the fuel cell converter 120 to boost the voltage output from the fuel cell 110 at the duty ratio D2 (step S110) and then terminates the boosting control process of FIG. 3.

When it is determined that the duty ratio D1 is equal to or less than the duty ratio D2 (step S100: NO), on the other hand, the fuel cell system 100 causes the fuel cell converter 120 to boost the voltage output from the fuel cell 110 at the duty ratio D1 (step S120) and then terminates the boosting control process of FIG. 3.

As described above, the fuel cell system 100 of the embodiment sets the duty ratio D2 as the upper limit of the duty ratio. When the duty ratio D1 is greater than the duty ratio D2, the FC-ECU 180 is configured to cause the fuel cell converter 120 to boost the voltage output from the fuel cell 110 at the duty ratio D2. This configuration prevents the fuel cell converter 120 from excessively boosting the actual voltage input from the fuel cell 110 and outputting the excessively boosted voltage.

B. Second Embodiment

A fuel cell 100a according to a second embodiment has a configuration similar to the configuration of the fuel cell system 100 of the first embodiment, except difference in control of the fuel cell converter 120 by the FC-ECU 180. In the fuel cell system 100a, in the case where the voltage output from the fuel cell 110 to the fuel cell converter 120 is to be boosted after the changeover of the operating state from the intermittent operation to the ordinary operation, when a duty ratio D1 calculated by Mathematical Formula I given below is greater than a duty ratio D3 calculated by Mathematical Formula III given below, the FC-ECU 180 is configured to cause the fuel cell converter 120 to boost the voltage output from the fuel cell 110 at the duty ratio D3.

[Math. 1]

$$D1 = 1 - \frac{Vltrg}{VH} \quad (I)$$

where VH (V) denotes a value of the output voltage that is output from the fuel cell converter 120, and Vltrg (V) denotes an estimated value of the voltage that is output from the fuel cell 110.

[Math. 3]

$$D3 = 1 - \frac{Vl}{Vhul} + \alpha \quad (III)$$

where Vl (V) denotes a measured value of the voltage of the fuel cell 110 by the voltage sensor 115, Vhul (V) denotes a predetermined upper limit value of the output voltage, and a denotes a correction amount of the duty ratio.

In the case where the voltage output from the fuel cell 110 to the fuel cell converter 120 is to be boosted after the changeover from the intermittent operation to the ordinary operation, when the duty ratio D1 is equal to or less than the duty ratio D3, on the other hand, the FC-ECU 180 is configured to cause the fuel cell converter 120 to boost the voltage output from the fuel cell 110 at the duty ratio D1.

The duty ratio D3 denotes a corrected value of the duty ratio used to boost the measured value Vl of the voltage of the fuel cell 110 by the voltage sensor 115 to the upper limit value Vhul. Whereas the duty ratio D2 is obtained by correcting the measured value Vl with the correction amount Vlmrg, the duty ratio D3 is obtained by correcting the duty ratio with the correction amount a.

The correction amount a is a numerical value used to correct the duty ratio, based on the error of the measured value Vl of the voltage of the fuel cell 110 by the voltage sensor 115 and the error in the fuel cell converter 120.

As described above, the fuel cell system 100a of the second embodiment sets the duty ratio D3 as the upper limit of the duty ratio. When the duty ratio D1 is greater than the duty ratio D3, the FC-ECU 180 is configured to cause the fuel cell converter 120 to boost the voltage output from the fuel cell 110 at the duty ratio D3. This configuration prevents the fuel cell converter 120 from excessively boosting the actual voltage input from the fuel cell 110 and outputting the excessively boosted voltage.

C. Modifications

According to the above embodiments, the FDC-ECU 170 and the FC-ECU 180 are provided as independent controllers. The present disclosure is, however, not limited to this configuration. For example, another controller provided in place of the independently provided FDC-ECU 170 and FC-ECU 180 may be configured to have the functions of the FDC-ECU 170 and the FC-ECU 180 as part of its functions. The functions of the FDC-ECU 170 and the FC-ECU 180 may be performed by one identical controller or may be performed by different controllers.

The disclosure is not limited to any of the embodiments, the examples, and the modifications described above but may be implemented by a diversity of other configurations without departing from the scope of the disclosure. For example, the technical features of any of the embodiments, the examples and the modifications may be replaced or combined appropriately, in order to solve part or all of the problems described above or in order to achieve part or all of the advantageous effects described above. Any of the technical features may be omitted appropriately unless the technical feature is described as essential herein. The present disclosure may be implemented by aspects described below.

(1) According to one aspect of the disclosure, there is provided a fuel cell system. This fuel cell system comprises a fuel cell configured to generate electric power using reactive gases; a voltage sensor configured to measure a voltage output from the fuel cell; a converter configured to boost an input voltage that is input from the fuel cell; and a controller configured to control the converter. In the case where the voltage output from the fuel cell to the converter is to be boosted after a changeover of an operating state of the fuel cell system from an intermittent operation to an ordinary operation, when a duty ratio D1 calculated by Mathematical Formula I is greater than a duty ratio D2 calculated by Mathematical Formula II, the controller causes the converter to boost the voltage output from the fuel cell at the duty ratio D2, and when the duty ratio D1 is equal to or less than the duty ratio D2, the controller causes the converter to boost the voltage output from the fuel cell at the duty ratio D1.

[Math. 1]

$$D1 = 1 - \frac{Vltrg}{VH} \quad (I)$$

where VH (V) denotes a value of output voltage that is output from the converter, and Vltrg (V) denotes an estimated value of voltage that is output from the fuel cell.

[Math. 2]

$$D2 = 1 - \frac{(Vl + Vlmrg)}{Vhul} \quad (II)$$

where Vl (V) denotes a measured value of voltage of the fuel cell by the voltage sensor, Vlmrg (V) denotes a correction amount of the measured value Vl, and Vhul (V) denotes a predetermined upper limit value of the output voltage.

In the fuel cell system of this aspect, the duty ratio D2 denotes a duty ratio used to correct the measured value Vl of voltage and boost the corrected value of voltage to the upper limit value Vhul. The duty ratio D2 is accordingly set as the upper limit of the duty ratio. When the duty ratio D1 is greater than the duty ratio D2, the fuel cell system of this aspect is configured to cause the converter to boost the voltage output from the fuel cell at the duty ratio D2. This configuration prevents the converter from excessively boosting the actual voltage input from the fuel cell and outputting the excessively boosted voltage.

(2) According to another aspect of the disclosure, there is provided a fuel cell system. This fuel cell system comprises a fuel cell configured to generate electric power using reactive gases; a voltage sensor configured to measure a voltage output from the fuel cell; a converter configured to boost an input voltage that is input from the fuel cell; and a controller configured to control the converter. In the case where the voltage output from the fuel cell to the converter is to be boosted after a changeover of an operating state of the fuel cell system from an intermittent operation to an ordinary operation, when a duty ratio D1 calculated by Mathematical Formula I is greater than a duty ratio D3 calculated by Mathematical Formula III, the controller causes the converter to boost the voltage output from the fuel cell at the duty ratio D3, and when the duty ratio D1 is equal to or less than the duty ratio D3, the controller causes the converter to boost the voltage output from the fuel cell at the duty ratio D1.

[Math. 1]

$$D1 = 1 - \frac{Vltrg}{VH} \quad (I)$$

where VH (V) denotes a value of output voltage that is output from the converter, and Vltrg (V) denotes an estimated value of voltage that is output from the fuel cell.

[Math. 3]

$$D3 = 1 - \frac{Vl}{Vhul} + \alpha \quad (III)$$

where Vl (V) denotes a measured value of voltage of the fuel cell by the voltage sensor, Vhul (V) denotes a predetermined upper limit value of the output voltage, and α denotes a correction amount of the duty ratio.

In the fuel cell system of this aspect, the duty ratio D3 denotes a corrected value of the duty ratio used to boost the measured value Vl of voltage to the upper limit value Vhul. The duty ratio D3 is accordingly set as the upper limit of the duty ratio. When the duty ratio D1 is greater than the duty ratio D3, the fuel cell system of this aspect is configured to cause the converter to boost the voltage output from the fuel cell at the duty ratio D3. This configuration prevents the converter from excessively boosting the actual voltage input from the fuel cell and outputting the excessively boosted voltage.

The present disclosure is not limited to the aspects of the fuel cell system described above but may be implemented by any of various other aspects, for example, a fuel cell system mounted on a vehicle or a marine vessel that is driven with electric power as the power source, such a vehicle or such a marine vehicle. The present disclosure may also be implemented by a computer program configured to implement such a fuel cell system, such a vehicle or such a marine vehicle. The present disclosure is not limited to any of the aspects described above but may be implemented by a diversity of other aspects without departing from the scope of the disclosure.

What is claimed is:

1. A fuel cell system, comprising:
   a fuel cell configured to generate electric power using reactive gases;
   a voltage sensor configured to measure a voltage output from the fuel cell;
   a converter configured to boost an input voltage that is input from the fuel cell; and
   a controller configured to control the converter, wherein
   in a case where the voltage output from the fuel cell to the converter is to be boosted after a changeover of an operating state of the fuel cell system from an intermittent operation to an ordinary operation,
      when a duty ratio D1 calculated by Mathematical Formula I is greater than a duty ratio D2 calculated by Mathematical Formula II, the controller causes the converter to boost the voltage output from the fuel cell at the duty ratio D2,

[Math. 1]

$$D1 = 1 - \frac{Vltrg}{VH} \quad (I)$$

where VH (V) denotes a value of output voltage that is output from the converter, and Vltrg (V) denotes an estimated value of voltage that is output from the fuel cell,

[Math. 2]

$$D2 = 1 - \frac{(Vl + Vlmrg)}{Vhul} \quad (II)$$

where Vl (V) denotes a measured value of voltage of the fuel cell by the voltage sensor, Vlmrg (V) denotes a correction amount of the measured value Vl, and Vhul (V) denotes a predetermined upper limit value of the output voltage, and
   when the duty ratio D1 is equal to or less than the duty ratio D2, the controller causes the converter to boost the voltage output from the fuel cell at the duty ratio D1.

2. A fuel cell system, comprising:
   a fuel cell configured to generate electric power using reactive gases;

a voltage sensor configured to measure a voltage output from the fuel cell;

a converter configured to boost an input voltage that is input from the fuel cell; and a controller configured to control the converter, wherein in a case where the voltage output from the fuel cell to the converter is to be boosted after a changeover of an operating state of the fuel cell system from an intermittent operation to an ordinary operation, when a duty ratio D1 calculated by Mathematical Formula I is greater than a duty ratio D3 calculated by Mathematical Formula III, the controller causes the converter to boost the voltage output from the fuel cell at the duty ratio D3,

[Math. 1]

$$D1 = 1 - \frac{Vltrg}{VH} \quad (I)$$

where VH (V) denotes a value of output voltage that is output from the converter, and Vltrg (V) denotes an estimated value of voltage that is output from the fuel cell,

[Math. 3]

$$D3 = 1 - \frac{Vl}{Vhul} + \alpha \quad (III)$$

where Vl (V) denotes a measured value of voltage of the fuel cell by the voltage sensor, Vhul (V) denotes a predetermined upper limit value of the output voltage, and α denotes a correction amount of the duty ratio, and when the duty ratio D1 is equal to or less than the duty ratio D3, the controller causes the converter to boost the voltage output from the fuel cell at the duty ratio D1.

* * * * *